(12) United States Patent
Smith

(10) Patent No.: US 9,170,069 B1
(45) Date of Patent: Oct. 27, 2015

(54) AIMPOINT OFFSET COUNTERMEASURES FOR AREA PROTECTION

(75) Inventor: Kirby A. Smith, Derry, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 586 days.

(21) Appl. No.: 13/526,122

(22) Filed: Jun. 18, 2012

Related U.S. Application Data

(60) Provisional application No. 61/498,794, filed on Jun. 20, 2011.

(51) Int. Cl.
| | |
|---|---|
| *G01S 7/36* | (2006.01) |
| *G01S 7/42* | (2006.01) |
| *H04K 3/00* | (2006.01) |
| *F41G 3/14* | (2006.01) |
| *G01S 7/495* | (2006.01) |
| *F41H 13/00* | (2006.01) |
| *F41H 11/02* | (2006.01) |
| *G01S 7/38* | (2006.01) |

(52) U.S. Cl.
CPC ............... *F41G 3/147* (2013.01); *F41H 11/02* (2013.01); *F41H 13/0056* (2013.01); *G01S 7/38* (2013.01); *G01S 7/495* (2013.01)

(58) Field of Classification Search
CPC ....... F41H 11/02; F41H 13/0056; G01S 7/38; G01S 7/495; F41G 3/147
USPC .......................................................... 342/14
See application file for complete search history.

(56) References Cited

U.S. PATENT DOCUMENTS

| | | | | |
|---|---|---|---|---|
| 4,014,482 | A * | 3/1977 | Esker et al. ................... | 244/3.13 |
| 4,155,096 | A * | 5/1979 | Thomas et al. ............... | 348/169 |
| 5,062,586 | A * | 11/1991 | Hobson et al. ................ | 244/3.12 |
| 7,044,044 | B2 * | 5/2006 | Rodriguez et al. ............. | 89/1.11 |
| 7,492,308 | B2 * | 2/2009 | Benayahu et al. .............. | 342/52 |
| 7,946,207 | B1 * | 5/2011 | Porter et al. ................... | 89/1.11 |
| 8,464,949 | B2 * | 6/2013 | Namey et al. .................. | 235/411 |
| 2004/0061595 | A1 * | 4/2004 | Yannone et al. ............ | 340/425.5 |
| 2005/0001755 | A1 * | 1/2005 | Steadman et al. .............. | 342/14 |
| 2005/0168375 | A1 * | 8/2005 | Halladay et al. ................ | 342/14 |
| 2006/0000988 | A1 * | 1/2006 | Stuart et al. ................ | 250/504 R |
| 2008/0273190 | A1 * | 11/2008 | Smith ........................... | 356/4.01 |

OTHER PUBLICATIONS

Walmsley et al., "Modelling of Countermeasures for AFV protection against IR SACLOS systems", Proc. of SPIE, vol. 5989, 5889C (2005).*

(Continued)

*Primary Examiner* — Frank J McGue

(74) *Attorney, Agent, or Firm* — Finch & Maloney PLLC; Neil F. Maloney; Daniel J. Long

(57) ABSTRACT

Techniques for missile countermeasures are disclosed. The techniques can be employed to rapidly detect a missile system location and aim a countermeasure set at the missile system goniometer, and capture the goniometer with a high radiant intensity countermeasure beam before the goniometer narrows its field of view (FOV). Capturing the goniometer before a narrowing of its FOV allows for wider area protection. The techniques can be embodied in an area-protection hit-avoidance system for a rapid Semi-Active Command to Line of Sight Anti-Tank Guided Missile (SACLOS ATGM) countermeasure wherein a SACLOS ATGM launch is rapidly detected and a countermeasure is aimed at the launch site so that the missile is diverted before the ATGM system FOV is narrowed. This early diversion or decoying of the missile guidance set allows the countermeasure to protect a greater area and to engage multiple threats in less time than traditional countermeasures.

17 Claims, 5 Drawing Sheets

(56) References Cited

OTHER PUBLICATIONS

Rapanotti et al., "Developing Vehicle Survivability on a Virtual Battlefield", RTO NMSG Conference on "Future Modeling and Simulation Challenges", Bredo, Netherlands, Nov. 12-14, 2001.*

Jacobson, Michael R., "ATGM Countermeasures", Infrantry, May-Jun. 1996.*

Multifunction Self Protection System (MUSS), http://www.defense-update.com/products/m/muss.htm , @2002-2005.*

* cited by examiner

AIMPOINT OFFSET COUNTERMEASURES FOR AREA PROTECTION

RELATED APPLICATIONS

This application claims the benefit of U.S. Provisional Application No. 61/498,794, filed Jun. 20, 2011.

STATEMENT OF GOVERNMENT INTEREST

This invention was made with United States Government Support under Contract No. DAAE07-97-C-X073 awarded by the United States Army. The United States Government has certain rights in this application.

FIELD OF THE DISCLOSURE

The present application relates to countermeasures against projectiles and more particularly to countermeasures against Semi-Active Command to Line of Sight Anti-Tank Guided Missiles (SACLOS ATGM).

BACKGROUND

A common weapon used against armored targets is the Semi-Active Command to Line of Sight Anti-Tank Guided Missile (SACLOS ATGM). These missile systems guide a missile to follow the line of sight (LOS) between a guidance set of the missile system and the target. The missile system operator establishes the LOS via a direct view optical sight or imaging sight, and the guidance set estimates the offset of the missile from the LOS by measuring the angle between the LOS to the target and the LOS to the missile. Because it makes an angle measurement, the guidance set is also called a goniometer. To find the LOS to the missile, the guidance set relies on detecting and tracking a beacon located at the missile. The guidance set generates commands to the missile to keep it heading toward the goniometer's aimpoint. The commands and related information are passed to the missile via a trailing wire, by radio frequency transmission, or other means. Typically the field of view (FOV) of the goniometer is wide at missile launch, just long enough to detect and "capture" the missile beacon. The radiant intensity of the missile beacon must be large enough for the goniometer to detect it in the presence of background clutter and other noise sources. Detection may be aided by limiting the spectral band-pass of the goniometer to optimize contrast with background noise. Commonly used spectral bands may be in the near infrared region and are determined by detector materials used. After the missile beacon is captured, the FOV of the goniometer rapidly changes to a narrow FOV to bring the missile to the LOS and, ultimately, the target. Typically, this narrowing of the FOV is completed within a few seconds of launch. Such missiles can effectively disable or destroy targets, such as armored vehicles.

SUMMARY

One embodiment of the present invention provides an area-protection hit-avoidance system. The system includes a threat detector positioned to detect a launch location (direction to launch) of a missile system, the missile system having an initial wide field of view (FOV) that transitions to a narrow FOV after missile launch. The system further includes a controller operatively connected to the threat sensor and configured to interpret the launch location and provide a countermeasure aiming control. The system further includes a countermeasure set operatively connected to the controller and configured to interpret the countermeasure aiming control and direct a jamming beam at the launch location prior to the missile system transitioning to the narrow FOV. In some cases, the missile system has one or more intermediate FOVs, and the area-protection hit-avoidance system is capable of directing a jamming beam at the launch location during one or more of those intermediate FOVs. In some cases, the missile system is a Semi-Active Command to Line of Sight Anti-Tank Guided Missile (SACLOS ATGM) system. In some cases, the area-protection hit-avoidance system is capable of being detached and offset by a distance from a target asset and protecting that asset against the missile system, and wherein the distance puts the area-protection hit-avoidance system outside the narrow FOV. In some cases, the threat detector includes at least one of an infrared sensor array and/or radar-based sensor. In some cases, the countermeasure set includes a laser sub-assembly configured to generate a jamming beam that has a radiant intensity that is at least 25% higher than radiant intensity of a missile beacon used for missile guidance by the missile system during engagement. In one such case, the jamming beam has a radiant intensity that is at least 2 times higher than radiant intensity of the missile beacon, and is some specific cases is 10 times higher than radiant intensity of the missile beacon (e.g., such as 50 or 100 or 200 or 400 times higher). In another such case, the laser sub-assembly is configured to generate a jamming beam that has narrow beam divergence of <25 mrad (x) by <25 mrad (y), or narrower.

Another embodiment of the present invention provides an SACLOS ATGM countermeasure system. The system includes a threat detector positioned to detect a launch location (direction to launch) of a SACLOS ATGM system, the SACLOS ATGM system having a guidance set and an initial wide FOV that transitions to a narrow FOV after missile launch. The system further includes a controller operatively connected to the threat sensor and configured to interpret the launch location and provide a countermeasure aiming control. The system further includes a countermeasure set operatively connected to the controller and configured to interpret the countermeasure aiming control and direct a jamming beam at the launch location so as to capture the guidance set of the SACLOS ATGM prior to the missile system transitioning to the narrow FOV. In some cases, the SACLOS ATGM system has one or more intermediate FOVs, and the countermeasure system is capable of directing a jamming beam at the launch location during one or more of those intermediate FOVs. In some cases, the countermeasure system is capable of being detached and offset by a distance from a target asset and protecting that asset against the SACLOS ATGM system, and wherein the distance puts the countermeasure system outside the narrow FOV. In some cases, the threat detector includes at least one of an infrared sensor array and/or radar-based sensor. In some cases, the countermeasure set includes a laser sub-assembly configured to generate a jamming beam that has a radiant intensity that is at least 25% higher than radiant intensity of a missile beacon of the SACLOS ATGM system during engagement. In one such case, the jamming beam has a radiant intensity that is at least 2 times higher than radiant intensity of the missile beacon, and in some specific cases is 10 times higher than radiant intensity of the missile beacon (e.g., or 100 times higher, etc). In another such case, the laser sub-assembly is configured to generate a jamming beam that has narrow beam divergence of <25 mrad (x) by <25 mrad (y), or narrower.

Another embodiment of the present invention provides a countermeasure method against a SACLOS ATGM system. The method includes detecting a launch location (direction to launch) of the SACLOS ATGM system, the SACLOS ATGM system having an initial wide FOV that transitions to a narrow FOV after missile launch. The method further includes interpreting the launch location and providing a countermeasure aiming control. The method further includes interpreting the countermeasure aiming control and directing a jamming beam at the launch location prior to the SACLOS ATGM system transitioning to the narrow FOV. In one such case, the missile system has one or more intermediate FOVs, and the area-protection hit-avoidance system is capable of directing a jamming beam at the launch location during one or more of those intermediate FOVs. In another case, the method is executed by a countermeasure system that is detached and offset by a distance from a target asset and protecting that asset against the SACLOS ATGM system, and wherein the distance puts the countermeasure system outside the narrow FOV. In some cases, the jamming beam has a radiant intensity that is at least 100 times higher than radiant intensity of a missile beacon of the SACLOS ATGM system during engagement. In some such cases, the jamming beam that has narrow beam divergence of <25 mrad (x) by <25 mrad (y), or narrower.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

Figure 1:
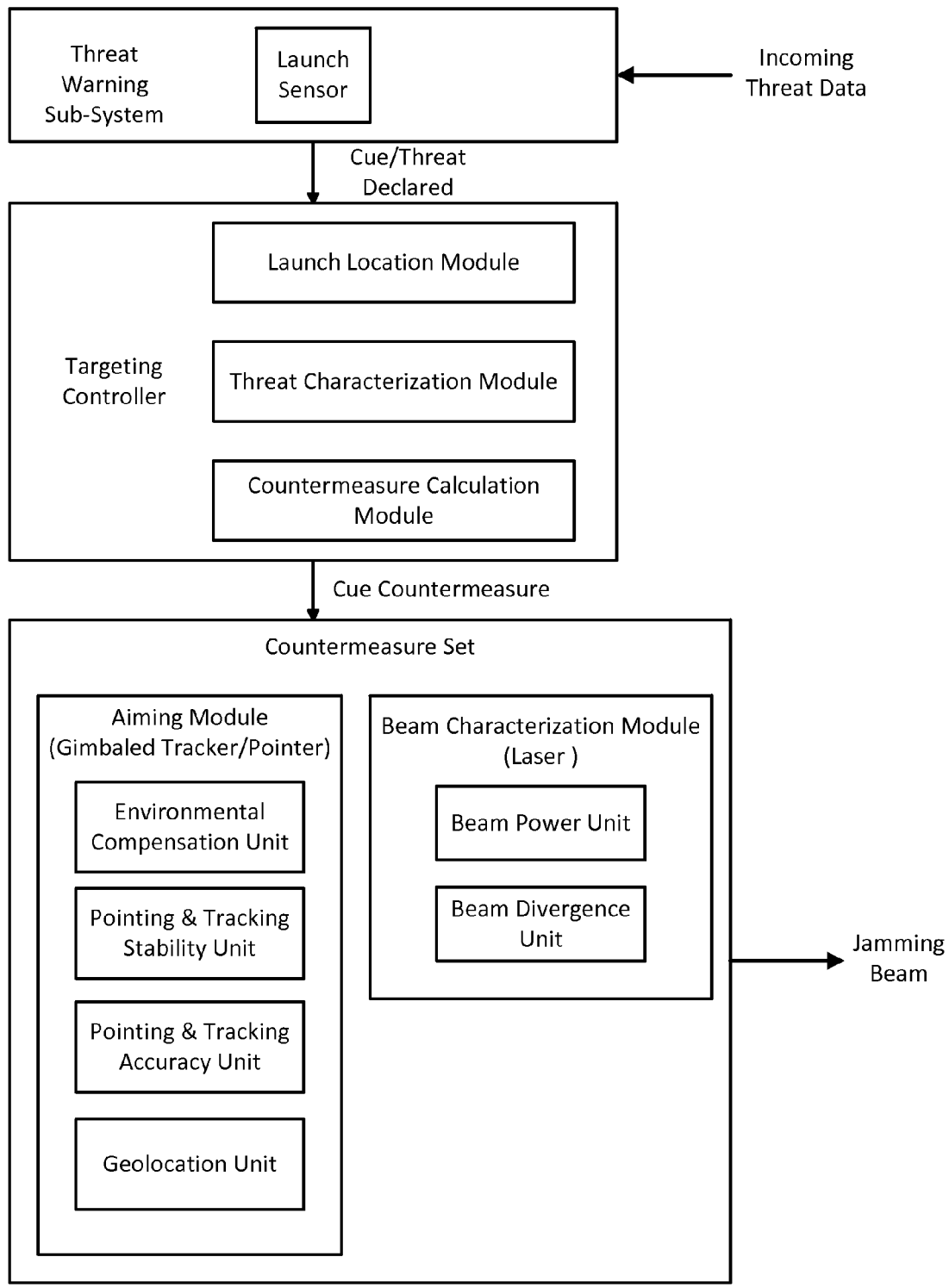
FIG. 1 illustrates a block diagram of a countermeasure system configured in accordance with an embodiment of the present invention.

As will be appreciated, note that the drawings are not necessarily drawn to a particular scale, but are presented to facilitate explanation and understanding of the claimed invention.

DETAILED DESCRIPTION

Techniques are disclosed for defeating missile threats such as SACLOS ATGMs. In one embodiment, the techniques can be implemented as a missile countermeasure methodology that generally includes detecting a missile launch and corresponding missile system location (direction to missile system), aiming a countermeasure set at a goniometer of the missile system, emitting a high radiant intensity countermeasure beam at the goniometer, and capturing the goniometer with the high radiant intensity countermeasure beam before the goniometer narrows its FOV. Another embodiment provides a missile countermeasure system capable of carrying out the methodology, including capturing the launcher goniometer during the initial wide FOV time period, and accurately emitting a high radiant intensity jamming beam to protect the target area soon after missile launch. In some example cases, this capture and jamming occurs within 3 seconds or less of launch. Note that herein terms such as "countermeasure" and "jamming" are used interchangeably, but the type of countermeasure being addressed is technically a deceptive countermeasure, and not one that jams in the classical sense where the goal is to completely inhibit communication (e.g., by catastrophically impairing a communication link). In contrast, the goal of the countermeasure in the context of various embodiments provided herein is to trick or otherwise deceive the missile system into targeting a false target.

General Overview

As previously explained, SACLOS ATGMs use a line of sight goniometer and a command transmission system to direct a missile to a given target. There are a number of non-trivial issues associated with robustly defending against such weapons. For example, SACLOS ATGM countermeasure systems are subject to restrictions on size, weight, power, and cost related to the platform capabilities of the protected target. For instance, if a SACLOS ATGM countermeasure set is too far away from the missile aimpoint, the countermeasure set will be outside the narrowed FOV of the goniometer and may not be effective. To this end, conventional countermeasure sets are generally limited to the protection of a single target having a size of about a tank (e.g., or smaller). Thus, protecting every vehicle in a convoy for example generally requires each vehicle to have a dedicated countermeasure set, which is expensive. Moreover, such point-based protection may not adequately protect other types of relatively large targets such as camps, industrial facilities, large transport platforms, and other such potential targets susceptible to SACLOS ATGM attack. In a more general sense, traditional countermeasures suffer from a limited effective area of protection because the countermeasure must be within the narrow FOV of the goniometer to be effective. Furthermore, traditional countermeasures can be susceptible to slow engagement with respect to multiple threats. Addressing such concerns typically implicates unacceptable size, weight, power, and cost burdens on the countermeasure system. These burdens, to the extent they are recognized, generally suggest that near-launch goniometer capture is an impractical solution to the problems associated with traditional SACLOS ATGM countermeasures.

Thus, and in accordance with an embodiment of the present invention, techniques are provided that enable SACLOS ATGM countermeasure systems capable of quickly protecting a large area and/or effectively engaging multiple threats. In one such case, the techniques are embodied in an area-protection hit-avoidance system that includes a high-speed threat launch detection sensor, a targeting controller, and a rapid-targeting narrow-beam countermeasure set. In operation, upon launch detection the system rapidly targets the goniometer and diverts the missile prior to any narrowing of the FOV, in accordance with some such embodiments. Each component of the hit-avoidance system can be optimized to achieve maximum or otherwise sufficient speed and radiant intensity while simultaneously maintaining desired accuracy sufficient to effectively divert a missile away from the protected area. In some embodiments, for example, this is achieved through optimization of threat launch detection, targeting control, countermeasure aiming, radiant intensity emitted by the countermeasure, and beam divergence to maximize radiant intensity of the countermeasure system and speed of goniometer capture while maintaining the minimum required accuracy and satisfying host platform limitations. This rapid technique effectively expands the area protected by the countermeasure because, by the time the wide initial FOV narrows to the exclusion of the countermeasure, the missile has been sufficiently captured and diverted so as to also be excluded from the FOV. Once the missile is out of the FOV, the goniometer loses guidance control and the missile will likely miss the protected target. Therefore, the effective area of protection is increased from the limited narrow FOV to the initial, more inclusive, wide FOV of the missile system. Additionally, the speed of this diversion allows the system to rapidly defend against multiple threats. Further, even if the present aimpoint offset countermeasure were to fail, such a failure could be detected early enough to activate other available countermeasures. Thus, the response(s) from a countermeasure system configured in accordance with such an embodiment are both timely and accurate.

In some such embodiments, responsibility for system reaction time is distributed amongst the launch detection sensor, targeting controller, and countermeasure set. The time required for the detection sensor to detect a threat, the time required for the targeting controller to determine and send appropriate command signals to the countermeasure set, and the time required for the countermeasure set to aim the jamming beam at the goniometer all combine to form the system reaction time. This response time (or delay) is accounted for in defending against specific missile systems at specific ranges, in accordance with some embodiments. Other factors typically considered, such as velocity of the protected platform, atmospheric conditions, etc. may also be relevant and further factored into the response scheme.

Accuracy of the countermeasure, on the other hand, is primarily allocated to the threat warning error in measuring threat launch location (direction to launch), the error in knowing the attitude of the threat warning sensor in the system coordinate frame, the error in knowing the attitude of the countermeasure in the system coordinate frame, and the error with which the countermeasure set can aim the jamming beam. Generally, the quadrature sum of the errors in one axis relative to the jamming beam divergence in that axis determines the probability of successful handover of the threat direction to the countermeasure set in that axis. The product of the probabilities in the elevation and cross-elevation axes can be used to determine the total probability of successful handover, in accordance with some embodiments. Assuming successful handover, the radiant intensity of the jamming beam affects how far from the goniometer the missile must be before the countermeasure can capture the goniometer's attention and thereby divert the flight path of the incoming missile. In general, the radiant intensity from a given power source increases as the inverse square of the beam divergence; thus a narrow beam can be used to meet platform-specific power source limitations while still providing the radiant intensity required for rapid capture of the goniometer, in accordance with an embodiment of the present invention. Specific beam parameters such as source power and jamming beam divergence are threat dependent and may widely vary given the particulars of a given engagement (e.g., missile beacon radiant intensity, distance to detected launch, environmental factors, speed and size of missile/threat, etc.), as will further be appreciated. Satisfying these requirements in accordance with an embodiment of the present invention, allows the countermeasure system to successfully achieve early, wide aimpoint offset jamming of a SACLOS ATGM.

The system can be used, for example, to protect a large target area, such as a large vehicle or a convoy of vehicles or a building structure or compound. In one example embodiment of the present invention, the countermeasure set is configured to emit a continuous wave or a modulated jamming signal that mimics the missile beacon, or otherwise interferes with the detection and measurement of the direction of the missile beacon by the goniometer. If the countermeasure set projects toward the goniometer a higher radiant intensity signal than the missile beacon such that the irradiance at the goniometer from the countermeasure set is sufficient to capture or degrade missile tracking, the missile system goniometer will be caused to incorrectly command the missile, causing it to miss its target. If the goniometer sees two sources, depending on its design it may track their centroid or be "captured" by the stronger of the two signals. In either case, the goniometer is no longer correctly measuring the angle between the target LOS and the missile LOS. If the countermeasure set is located at the goniometer aimpoint, the result is that the missile flies without corrective guidance. If the countermeasure set is located above the aimpoint, the missile is directed to fly down, while if the countermeasure set is to the right of the aimpoint, the missile is directed to fly left (and vice-versa). Ideally, the countermeasure set will cause the missile to be directed outside the wide FOV of the missile guidance set or into the ground before reaching its target, in accordance with some embodiments.

System Architecture

FIG. 1 illustrates a block diagram of a countermeasure system configured in accordance with an embodiment of the present invention. The system can be used as an area-protection hit-avoidance system in any number of applications, as will be appreciated in light of this disclosure. The system may be implemented on the actual platform or structure that is being targeted, or on a location that is proximate to the target such as a neighboring platform or structure. Numerous variations will be apparent in light of this disclosure.

As can be seen, the system generally includes a threat warning sub-system, a targeting controller, and a countermeasure set configured with a directable laser for jamming. In general, each of these main components can be implemented as conventionally done. However, they are further configured with additional or otherwise improved structure and/or capability as will be the focus of the description herein. As can be further seen, the threat warning system includes a sensor such as an infrared (IR) sensor and/or any other type capable of detecting events indicative of a missile launch (e.g., such as radar and radar cued by a high or low resolution passive threat launch sensor). The targeting controller includes a launch location module, a threat characterization module, and a countermeasure calculation module. The countermeasure set generally includes a gimbaled pointer/tracker sub-assembly that includes an aiming module and a laser sub-assembly that includes a beam characterization module. The aiming module includes an environmental compensation unit, pointing/tracking stability unit, pointing/tracking accuracy unit, and a geolocation unit. The beam characterization module includes a beam power unit and a beam divergence unit. Each of these components will be discussed in turn.

In operation, the threat warning sub-system of the example embodiment shown in FIG. 1 continuously monitors the area where potential threats may initiate. When the threat warning system declares a missile threat and sends a cue to the targeting controller, the target engagement mode commences. In some cases, the cue signal contains the inertial coordinates of the targeted threat. The pointer/tracker of the aiming module sub-assembly of the countermeasure set receives the handoff cue from the targeting controller, and rapidly slews the gimbal to the threat location somewhere in the countermeasure set field of regard (FOR). As will be appreciated, the purpose of inertial handover is to have a direction that is relatively slow to change even if the platform has high angular rates. To this end, inertial coordinates indicate directions typical of a passive sensor, but other embodiments may include location in the cue signal if an active sensor (e.g., radar) is used. In stable situations (such as a camp rather than a charging tank), further note that inertial handover is unnecessary, so such may be optional depending on the scenario. When the pointer/tracker of the aiming module receives a cue in inertial coordinates, it can use the platform inertial information to convert the cue to the coordinate frame of the pointer/tracker assembly, which then slews to that direction in the pointer/tracker coordinate frame. As will be further appreciated, such can be performed as a continuous update, such that while the cue inertial coordinates are static, the pointer/tracker coordinates are dynamic. The pointer/tracker continuously re-computes direction in its coordinate frame so that as the platform rolls, pitches, and yaws, the pointer/tracker slews oppositely, maintaining a stable beam direction in inertial coordinates, in accordance with some configurations.

In general, countermeasure systems are typically configured with threat warning capability and a laser directable countermeasure such that the threat warning hands-over to the directable laser countermeasure a direction for jamming, into which the countermeasure slews to and emits energy. However, as previously explained, conventional SACLOS ATGM countermeasure systems provide a point-based defense. That is, protection of a single, tank-sized vehicle. In a typical such countermeasure system, the countermeasure is mounted not very far from the normal missile system aim-point (vehicle centroid), so the jammer is in the guidance link's FOV for the entire missile flight. This makes jamming possible for the entire flight. However, jamming need only be effective somewhere along the missile flight path such that the missile misses, or preferably is commanded into the ground before reaching any assets. In any case, such countermeasure systems cannot protect a target against the SACLOS ATGM system if the target (generally, the aimpoint of the missile system) is widely separated from the jammer's location, given the subsequent narrowing FOV of the SACLOS ATGM system guidance sensor (goniometer). In short, the narrowed FOV effectively excludes the jamming signal.

The example embodiment of the present invention shown in FIG. 1 recognizes that the effective counter-countermeasure inherent in the subsequent narrowing FOV of a missile system that rejects the jammer signal is also its Achilles' heel. In particular, early jamming can be used to cause the missile to maneuver within the initial (wide) goniometer FOV such that it is outside the next stage (narrower) field of view. Upon transitioning from a wide FOV to a narrow FOV, goniometer detection of the missile beacon is also lost along with the jammer (i.e., the goniometer of the missile rejects or otherwise excludes its own missile beacon).

Taking advantage of this susceptibility can be carried out using a coordinated revision of baseline or otherwise given SACLOS ATGM countermeasure system components and characteristics, in accordance with one example embodiment of the present invention. In one such example case, these revisions include: (a) configuring the threat warning function's resolution and processing performance so that it accurately and timely cues the countermeasure with respect to the goniometer transitioning from wide FOV to narrow FOV; and (b) configuring the countermeasure function's laser power, laser divergence, pointing stability, and pointing accuracy so that jamming is effective much sooner than necessary for a point-based defense, which in one example embodiment is just after launch and prior to the narrowing of the goniometer's initial FOV (e.g., launch+5 seconds or less, or launch+3 seconds or less, or launch+2 seconds or less, depending on factors such as the missile system configuration and distance to target).

Threat Warning System/Sensor

In some embodiments, the threat warning resolution is enhanced relative to conventional sensors used in SACLOS ATGM countermeasure systems so as to provide a sensor that has a tighter beam (e.g., in the case of radar-based threat warning sensors) or more pixels (e.g., in the case of IR threat warning sensors). Likewise, the threat warning processing performance is enhanced relative to conventional sensors used in SACLOS ATGM countermeasure systems so as to obtain a threat declaration (and associated threat direction) in less time. As will be appreciated in light of this disclosure, this can be achieved, for example, using higher performance processors for performing the threat detection, higher performance algorithms run on such processors, and/or in the case of IR sensors, higher frame rate focal plane arrays (FPA). In some example embodiments, the sensor is implemented with one of the sensors described in U.S. patent application Ser. No. 13/460,155, filed Apr. 30, 2012, and titled "Multi-Zone Approach for Active/Passive Sensing" which is herein incorporated by reference in its entirety. Such sensors may employ a massively parallel readout architecture and/or fast slewing unit cell integrators to facilitate faster readout and frame rates. In one specific example embodiment, the warning sensor is a 256×256 array of pixels for sensing IR. The sensor may include a multi-zone sensing array configured for use in a dual-mode active/passive sensor system, and a rapid readout mode is enabled for both passive and active imaging. During threat detection in the context of a SACLOS ATGM engagement, such a dual mode sensor can operate in passive mode (i.e., receives energy emanating from the missile/launcher) and rapidly detect and report detected launch activity. A frame rate in the range of, for instance, 1 µsec to 5 msec or 5 µsec to 1 msec can be used. In a more general sense, the resolution and response time of the sensor is sufficient to rapidly detect and report a missile launch (e.g., launch detected and reported within the range of 100 µs to 1000 µms), such that the threat warning system can rapidly declare the threat and notify the targeting controller/countermeasure set of same and leave sufficient time to direct a jamming beam of high radiant intensity into the goniometer's initially wider FOV. In some example embodiments, the cue to direct the jamming beam is generated in less than 2 seconds, and the jamming beam is slewed to jam the missile system in less than 1 second from receiving the jam cue, for a total response time of 3 seconds or less. In other embodiments, the cue to direct the jamming beam is generated in less than 1.5 seconds, and the jamming beam is slewed to jam the missile system in less than 500 ms from receiving the jam cue, for a total response time of 2 seconds or less. In still other embodiments, the cue to direct the jamming beam is generated in less than 750 ms, and the jamming beam is slewed to jam the missile system in less than 250 ms from receiving the jam cue, for a total response time of 1 second or less.

Targeting Controller

The targeting controller can be implemented as conventionally done, and generally interfaces the threat warning system with the countermeasure set. In other embodiments, note that the functionality of the targeting controller can be integrated into, for example, the threat warning system such that the threat warning system communicates directly with the countermeasure set. The controller can be implemented, for instance, with a computer having a state of the art processor (including co-processor and parallel processing schemes to maximize or otherwise enhance processing speed) programmed with the modules shown, or in gate level logic or purpose-built silicon, or a microcontroller configured with input/output capability and embedded routines to carry out the module functionality. Numerous variations and embodiments will be apparent in light of this disclosure.

The launch location module is programmed or otherwise configured to receive the cue from the threat warning system indicating a declared threat and initial coordinate information that can be used by the launch location module to identify the location of the missile system within the established coordinate system of the countermeasure set. As will be appreciated, this "location" of the launch can be specified as a direction to the launcher and need not be an absolute location. The threat characterization module is programmed or otherwise configured to evaluate the information received from the threat warning system and to make any possible judgments as to the nature of the missile system that has engaged. The threat characterization module may include a database of known missile system characteristics (e.g., plume size, frequencies, wavelengths, temperature, and/or any other such tell-tale indicators). Thus, if sufficient information is provided, the threat characterization module can identify the missile system and pass that information to the countermeasure calculation module. If no features of the specific missile system can be identified, a default parameter can be presumed, in accordance with some embodiments. In some cases, partially learned data can be combined or otherwise supplemented with default data if so desired. The countermeasure calculation module is programmed or otherwise configured to prepare the cue message to the countermeasure set, which generally includes all known information about the missile, such as missile beacon power and/or wavelength, missile speed, missile size, and any other information about the missile and/or environment that can be used in performing countermeasures.

Countermeasure Set

The countermeasure set receives the cue signal from the targeting controller, and passes the appropriate information to the beam characterization module, which is programmed or otherwise configured to configure the jamming beam for the given perceived threat. The beam power unit is configured to provide the jamming beam power, and the beam divergence unit is configured to provide a beam having the desired divergence, shape, and any other beam qualities of interest. As will be appreciated in light of this disclosure, the power/radiant intensity of the jamming beam is generally set to be greater than or otherwise to mitigate the radiant intensity of the missile beacon so as to deceive the missile system. In addition to laser power, other enhancements can be made as well with respect to countermeasure laser divergence, pointing stability, and pointing accuracy so that jamming is effective prior to narrowing of the goniometer FOV, in accordance with some embodiments of the present invention. For instance, the countermeasure system shown in FIG. 1 can be configured to emit sufficient radiant intensity that allows it to capture the missile guidance link (by dominating the missile beacon) shortly after launch and while the goniometer FOV is in its in initial wide state (or otherwise sufficiently wide enough), which in turn diverts the missile to the edge of the goniometer's existing FOV so it will be lost when the FOV narrows past that edge. As previously explained, the radiant intensity from a given laser source increases as the inverse square of the beam divergence; thus a narrow beam can be used to meet platform-specific power source limitations while still providing the radiant intensity required for rapid capture of the goniometer, in accordance with an embodiment of the present invention. Specific beam parameters such as source power and jamming beam divergence are threat dependent and may widely vary given the particulars of a given engagement (e.g., missile beacon radiant intensity, distance to detected launch, environmental factors, speed and size of missile/threat, etc), as will further be appreciated. In one specific example embodiment, the radiant intensity from the countermeasure laser is at least 25% greater than the radiant intensity of the missile system beacon, and in some such cases is more than 50% or 75% or 100% greater than the beacon radiant intensity, and up to 500 times or more greater depending on engagement scenario. In some cases, the laser has a power in the range of 25 to 100 watts, a beam divergence of <25 mrad (x) by <25 mrad (y), and any suitable shape (e.g., square, round, or rectangular). In some such cases, the laser has a power in the range of 50 to 100 watts, a beam divergence of <15 mrad (assuming a circular beam). In one such example scenario, the laser beam diverges from an initial lens diameter of, for example, 2 to 10 mm to a larger spot size at the targeted missile system (e.g., 2 to 10 m spot size, depending on range and divergence angle). Many configurations will be apparent in light of this disclosure, and the claimed invention is not intended to be limited to a particular set or range of laser parameters.

In addition to these laser sub-assembly enhancements, a number of optional enhancements can also be made to the gimbaled pointer/tracker sub-assembly. In particular, the environmental compensation unit receives environmental condition information from the cue signal, and can use that information in directing the gimbal in such as way so as to compensate for such conditions where appropriate. The pointing/tracking stability unit can be used to eliminate or otherwise reduce jitter and overshoot, depending on the platform being defended. The pointing/tracking accuracy unit works in conjunction with the environmental compensation unit and the geolocation unit to ensure that the gimbal is slewed and otherwise directed appropriately given the coordinate system of the countermeasure system relevant to the targeted missile system and the various environmental factors that have a predictable impact on countermeasures being provided.

Thus, a number of variables can be considered in the countermeasure response. For example, if a missile were to be defeated after 100 meters of flight, and the missile were launched at a distance from the jammer of 2 km, and the countermeasure irradiance had to equal or exceed that from the missile beacon, then the radiant intensity of the countermeasure could be the square of the range ratio, or 400 times, that of the missile beacon, in accordance with some embodiments. Hence, to defeat a missile with a beacon radiant intensity of, say, 100 W/sr (watts/steradian) radiant intensity, the jammer radiant intensity would be 400 times larger, or 40,000 W/sr. As will be further appreciated in light of this disclosure, achieving this radiant intensity with practical diode laser sources operating in, for example, the 10 W regime can be accomplished using a low divergence laser beam. In one example case of such a laser source and required radiant intensity, the beam solid angle could be, for instance, 2.5× 10−4 sr (steradians). This is equivalent to a circular divergence of 18 milliradians. To have a high probability of placing this divergence on the goniometer, the uncertainty in pointing can be, for example, around one sixth of this divergence, or about 3 milliradians. This uncertainty can be computed as the quadrature sum of the threat warning sub-system (warner) direction error, warner-to-jammer handover error, and jammer pointing error. Suitable optical sensors for such an application can be configured with several hundreds of pixels over each direction of their FOR to meet this performance (e.g., 256×256 or 512×512 arrays), and a radar-based sensor must have a milliradian-class beam and commensurate large aperture to provide such accuracy. To aim the jammer (countermeasure set) at the direction of the goniometer within the time it takes for the missile fly-out to reach 100 meters in the example above (less than one-half second), the threat warning and threat direction sensing sub-system(s), whether a single sensor or a combination of sensors, can be configured to work in concert with a fast jammer pointing system to meet the 100 meter fly-out timeline. As will be appreciated in light of this disclosure, the functions performed within this timeline may include, for example, processing sensor data for threats and declaring the threat, processing direction in sensor coordinates and converting to inertial coordinates, central processing for allocating the threat to the jammer (countermeasure set), and jammer slew and settling time.

Methodology

Figure 2:
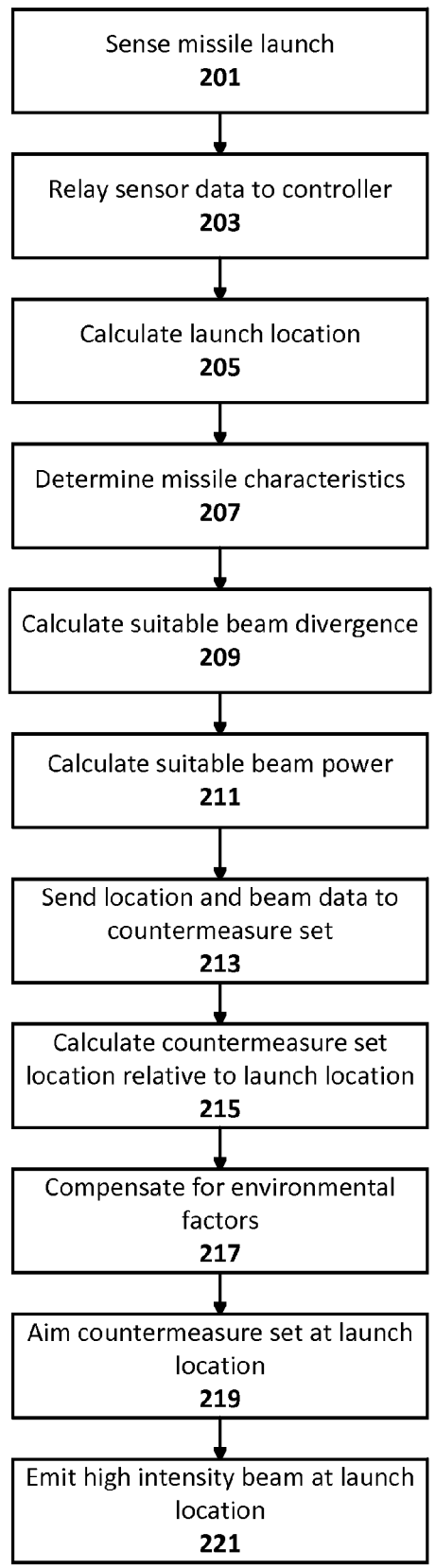
FIG. 2 illustrates a methodology of performing countermeasures in accordance with an embodiment of the present invention.
Figure 3A:
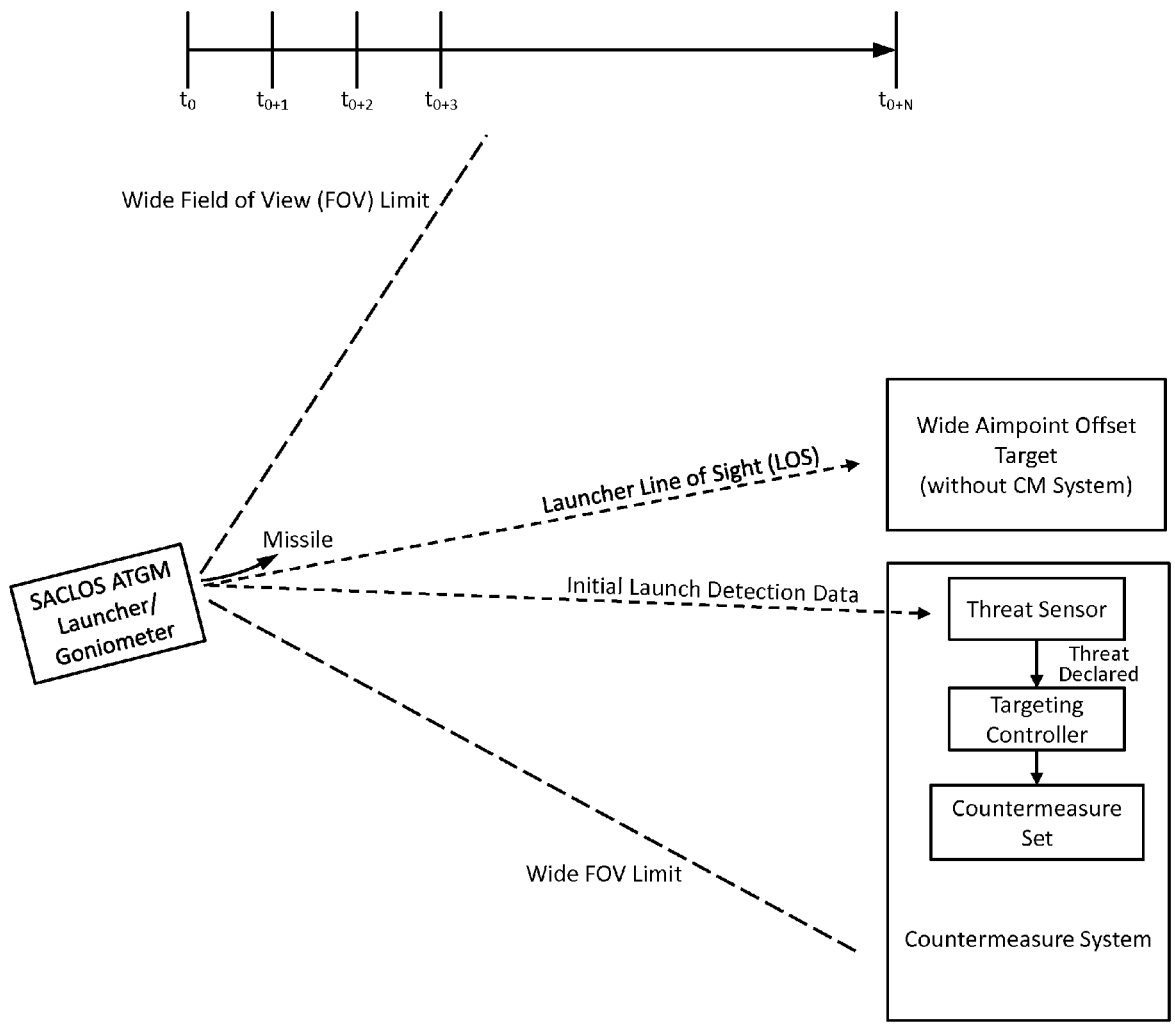
FIGS. 3a-c illustrate various phases of an engagement between a missile system and a target being protected by a countermeasure system configured in accordance with an embodiment of the present invention.
Figure 3B:
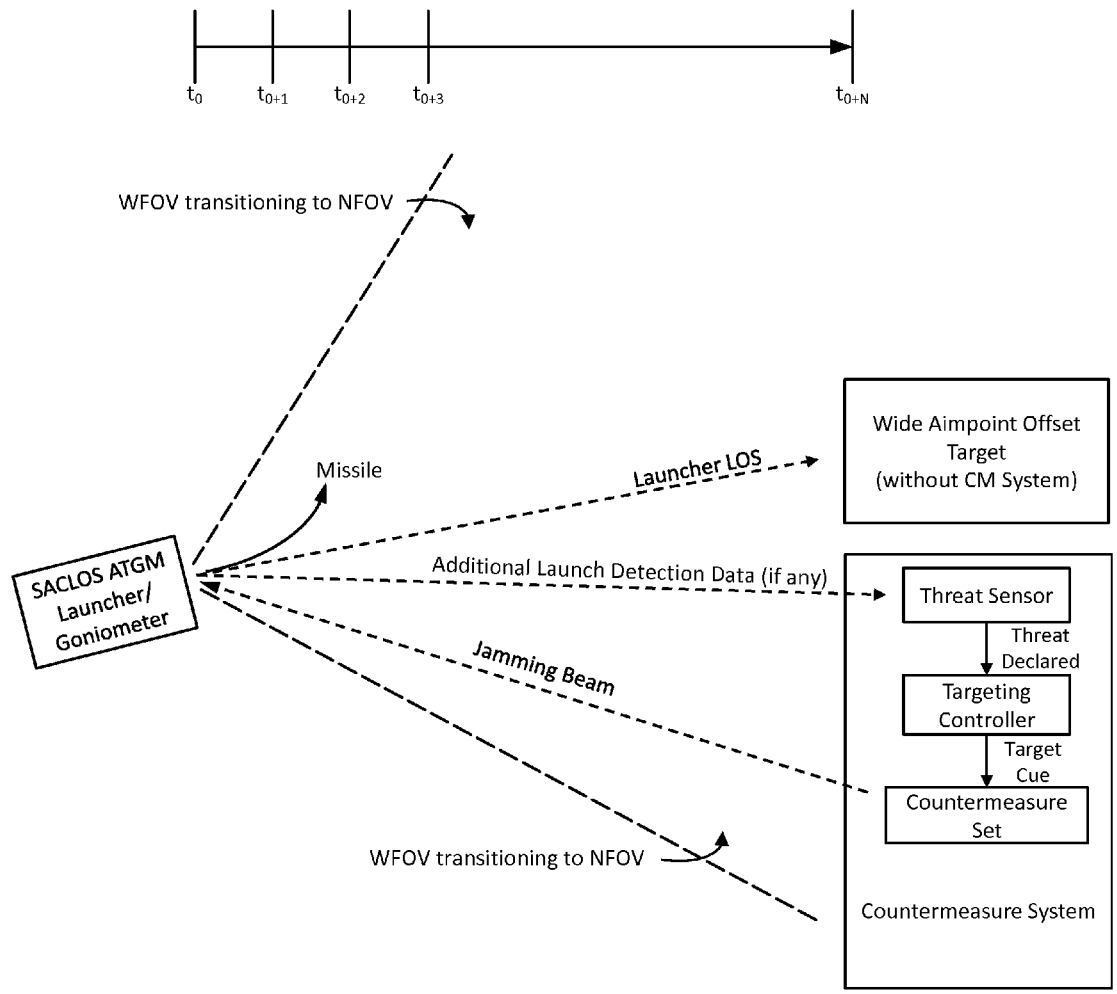
Figure 3C:
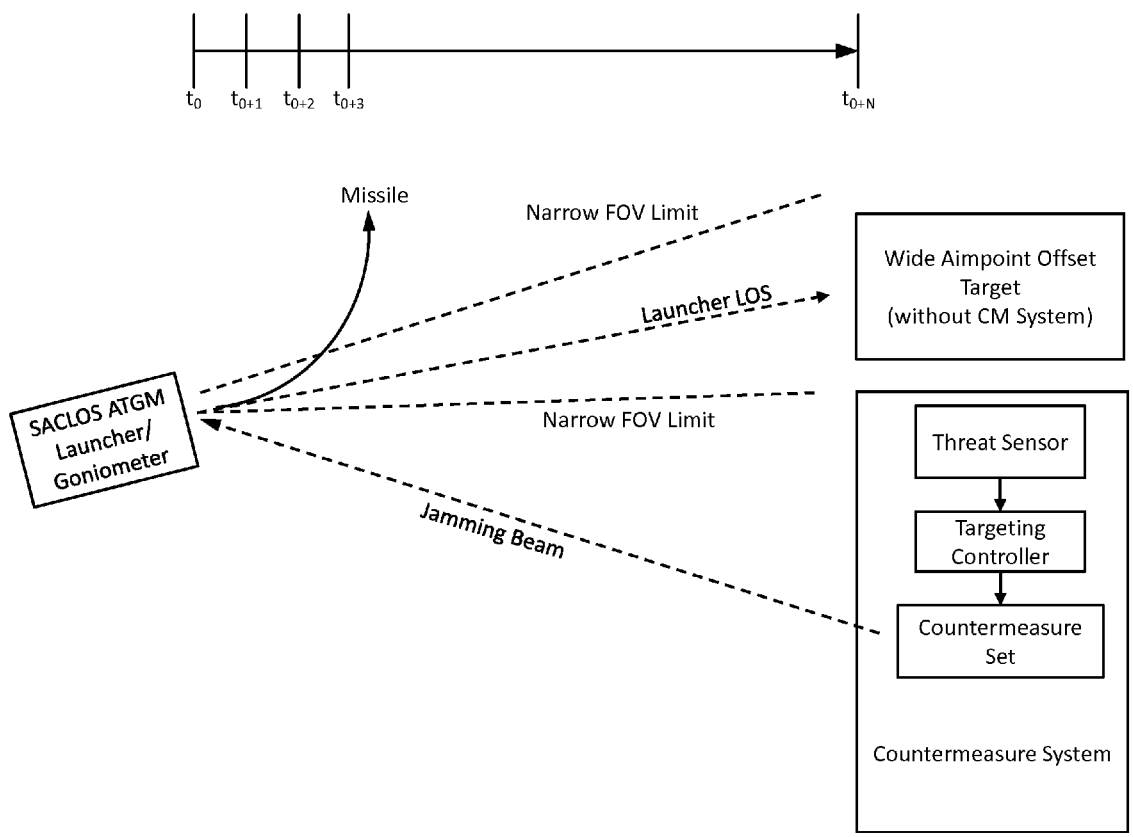

FIG. 2 illustrates a methodology of performing countermeasures in accordance with an embodiment of the present invention. As will be appreciated in light of this disclosure, the method can be carried out, for example, by the system shown in FIG. 1 or any another SACLOS ATGM countermeasure system that has be enhanced as variously described herein. FIGS. 3a-c will also be referred to, which show various stages of the engagement.

The method includes sensing 201 a missile launch, and relaying 203 sensor data to targeting controller. The method continues with the targeting controller calculating 205 a launch location (which may be a direction to the launcher) and determining 207 missile characteristics based on threat characterization data. The method continues with calculating 209 the maximum or otherwise suitable divergence, and calculating 211 the maximum or otherwise suitable beam radiant intensity. As previously explained, the beam radiant intensity and/or divergence can be computed based on the learned missile characteristics, such as the beacon radiant intensity, or set to default values having high confidence suitability. The method continues with sending 213 the launch location (which may be a direction to launcher) and beam data to the countermeasure set, so that jamming can commence.

FIG. 3a demonstrates this initial stage of engagement, just after launch conditions, in accordance with one example embodiment of the present invention. As can be seen, the target of the missile system as identified by the launcher LOS is not outfitted with a countermeasure (CM) system, but a nearby asset is. Hence, the missile system's target is referred to as a wide aimpoint offset target (without CM system), as it is offset a significant distance from the countermeasure set. Note, however, that in this early phase of the engagement, both the missile system target and the countermeasure set are within the SACLOS ATGM system's wide FOV. Upon launch, the threat sensor of the countermeasure system receives data indicative of the launch, and allows a threat to be declared. The targeting controller is then notified of the launch and any particular information known about that launch (missile type, etc.). As can be further seen from the time scale, the missile is at $t_0+1$ time unit (e.g., wherein a time unit=1 second, for instance) into the launch, and the initial launch data has been sensed and passed to the targeting controller.

With further reference to FIG. 2, the method continues with calculating 215 the countermeasure set location relative to the launch location, and may further include compensating 217 for environmental factors. The method continues with aiming 219 the countermeasure set at launch location/direction, and emitting 221 a high radiant intensity beam at the launch location so as to deceive/decoy the guidance set or so-called goniometer of the SACLOS ATGM prior to it changing to its narrow FOV. The method operates to effectively extend the countermeasure set performance to protecting a larger region around the countermeasure set such that nearby vehicles (or other assets) without countermeasure sets may be protected, or larger objects than an armored vehicle may be protected.

FIG. 3b demonstrates the stage of engagement at the time the missile system FOV begins to switch from the wide FOV to a narrower FOV, in accordance with one example embodiment of the present invention. As can be seen, the targeting controller has already passed the jamming cue to the countermeasure set, which has in turn skewed the gimbaled laser pointer/tracker to direct an appropriate jamming beam at the goniometer of the missile system. As can be further seen from the time scale, the missile is at $t_0+2$ time units or less into the launch. In other embodiments, note that the initial wide FOV may already have transitioned to some intermediate FOV at this stage. So long as the nearby or otherwise offset countermeasure system is still in the goniometer FOV, early jamming can still take place.

FIG. 3c demonstrates the stage of engagement at the time the missile system FOV has switched from the wide FOV to the narrowest FOV, in accordance with one example embodiment of the present invention. As can be seen, not only is the jamming beam outside the guidance set (goniometer) FOV, but so is the missile. As such, the missile beacon can no longer be sensed by the goniometer and the missile will therefore be defeated. As can be further seen from the time scale, the missile is at $t_0+3$ time units or so into the launch.

In general, the countermeasure set has to be within the FOV for a long enough period of time to cause the guidance set to direct the missile into the ground or out of the goniometer FOV. The radiant intensity of the countermeasure set has to be high enough to capture the goniometer at some point during the initial flight such that there is sufficient remaining time to decoy the missile before it impacts the protected vehicle. The narrower the FOV at the time the countermeasure set captures the goniometer, the smaller the protection zone that the countermeasure set can protect. So, in some embodiments, the protected area is an intermediate area somewhere between the largest possible area that can be protected and the smallest area protected, depending on how much the FOV has narrowed.

As will be appreciated in light of this disclosure, jamming time is generally affected by the irradiance ratio of jammer illumination to missile beacon illumination. The beacon illumination varies inversely with the missile fly-out distance away from the guidance set. Thus, rapid and accurate measurement from the threat warning, and accurate and rapid pointing of the countermeasure set allows the countermeasure set to project high energy in a narrow beam divergence without missing the goniometer. The radiant intensity from a given laser source increases as the inverse square of the beam divergence; thus a narrow divergence allows a more practical lower power source for the jamming signal in accordance with some embodiments.

Such wide aimpoint offset jamming techniques provide a number of benefits, in accordance with various embodiments. For instance, early countermeasure allows the countermeasure set to countermeasure more near simultaneous threats because the switch to narrower FOV may occur within about 2 to 3 seconds of ATGM launch. In concert with appropriate sensors, such as radar, failure to achieve early countermeasure is observable and may indicate presence of a different threat type to which some other countermeasure, if available, can be allocated in time to be effective.

The foregoing description of the embodiments of the invention has been presented for the purposes of illustration and description. It is not intended to be exhaustive or to limit the invention to the precise form disclosed. Many modifications and variations are possible in light of this disclosure. For example, an optimal embodiment may be particularly configured based on the circumstances of a given application or engagement, including factors such as the threat posture, platform, size, weight, and power limits, cost-constraints, etc. It is intended that the scope of the invention be limited not by this detailed description, but rather by the claims appended hereto.

What is claimed is:

1. An area-protection hit-avoidance system for jamming a missile system having an initial wide field of view (FOV) that transitions to a narrow FOV after missile launch, the area-protection hit-avoidance system comprising:
    a threat detector positioned to detect a launch location of the missile system;
    a controller operatively connected to the threat detector and configured to identify the launch location and provide a countermeasure aiming control; and
    a countermeasure set operatively connected to the controller and configured to interpret the countermeasure aiming control and direct a jamming beam at the identified launch location;
    wherein response time of the area-protection hit-avoidance system from initial detection of the launch location to directing the jamming beam at the identified launch location is 3 seconds or less; and
    wherein the area-protection hit-avoidance system is capable of being detached and offset by a distance from a target asset and protecting that asset against the missile system, and wherein the distance puts the area-protection hit-avoidance system outside the narrow FOV.

2. The area-protection hit-avoidance system of claim 1 wherein the response time of the area-protection hit-avoidance system from initial detection of the launch location to directing the jamming beam at the identified launch location is 2 seconds or less.

3. The area-protection hit-avoidance system of claim 1 wherein the jamming beam directed by the countermeasure set is configured to jam a Semi-Active Command to Line of Sight Anti-Tank Guided Missile (SACLOS ATGM) system.

4. The area-protection hit-avoidance system of claim 1 wherein the threat detector includes at least one of an infrared sensor array and a radar-based sensor.

5. The area-protection hit-avoidance system of claim 1 wherein the countermeasure set includes a laser sub-assembly configured to generate a jamming beam that has a radiant intensity that is at least two times higher than radiant intensity of a missile beacon used for missile guidance by the missile system during engagement.

6. The area-protection hit-avoidance system of claim 5 wherein the jamming beam has a radiant intensity that is at least 10 times higher than radiant intensity of the missile beacon.

7. The area-protection hit-avoidance system of claim 5 wherein the laser sub-assembly is configured to generate a jamming beam that has narrow beam divergence of <25 mrad (x) by <25 mrad (y), or narrower.

8. A countermeasure system for jamming a SACLOS ATGM system having an initial wide FOV that transitions to a narrow FOV after missile launch, the countermeasure system comprising:
    a threat detector positioned to detect a launch location of the SACLOS ATGM system;
    a controller operatively connected to the threat detector and configured to identify the launch location and provide a countermeasure aiming control; and
    a countermeasure set operatively connected to the controller and configured to interpret the countermeasure aiming control and direct a jamming beam at the identified launch location;
    wherein response time of the countermeasure system from initial detection of the launch location to directing the jamming beam at the identified launch location is 3 seconds or less; and
    wherein the countermeasure system is capable of being detached and offset by a distance from a target asset and protecting that asset against the SACLOS ATGM system, and wherein the distance puts the countermeasure system outside the narrow FOV.

9. The countermeasure system of claim 8 wherein the response time of the countermeasure system from initial detection of the launch location to directing the jamming beam at the identified launch location is 2 seconds or less.

10. The countermeasure system of claim 8 wherein the threat detector includes at least one of an infrared sensor array and a radar-based sensor.

11. The countermeasure system of claim 8 wherein the countermeasure set includes a laser sub-assembly configured to generate a jamming beam that has a radiant intensity that is at least two times higher than radiant intensity of a missile beacon of the SACLOS ATGM system during engagement.

12. The countermeasure system of claim 11 wherein the jamming beam has a radiant intensity that is at least 10 times higher than radiant intensity of the missile beacon.

13. The countermeasure system of claim 11 wherein the laser sub-assembly is configured to generate a jamming beam that has narrow beam divergence of <25 mrad (x) by <25 mrad (y), or narrower.

14. A countermeasure method against a SACLOS ATGM system having an initial wide FOV that transitions to a narrow FOV after missile launch, the countermeasure system, comprising:
    detecting a launch location of the SACLOS ATGM system;
    identifying the launch location and providing a countermeasure aiming control; and
    interpreting the countermeasure aiming control and directing a jamming beam at the identified launch location;
    wherein response time from initial detection of the launch location to directing the jamming beam at the identified launch location is 3 seconds or less; and
    wherein the method is executed by a countermeasure system that is detached and offset by a distance from a target asset and protecting that asset against the SACLOS ATGM system, and wherein the distance puts the countermeasure system outside the narrow FOV.

15. The method of claim 14 wherein the response time from initial detection of the launch location to directing the jamming beam at the launch location is 2 seconds or less.

16. The method of claim 14 wherein the jamming beam has a radiant intensity that is at least 100 times higher than radiant intensity of a missile beacon of the SACLOS ATGM system during engagement.

17. The method of claim 14 wherein the jamming beam that has narrow beam divergence of <25 mrad (x) by <25 mrad (y), or narrower.

* * * * *

UNITED STATES PATENT AND TRADEMARK OFFICE
CERTIFICATE OF CORRECTION

Page 1 of 2

PATENT NO. : 9,170,069 B1
APPLICATION NO. : 13/526122
DATED : October 27, 2015
INVENTOR(S) : Kirby A. Smith It is certified that error appears in the above-identified patent and that said Letters Patent is hereby corrected as shown below:

Title page

Item (54) Title, and in the Specification, column 1, line 1, should read:

"POINT OF AIM OFFSET COUNTERMEASURES FOR AREA PROTECTION"

In the Drawings

In Figures 3a, 3b, and 3c should read:

"Wide Point of Aim Offset Target (without CM System)"

In the Specification

In Column 1, line 38 should read:

"...heading toward the goniometer's point of aim."

In Column 4, line 19 should read:

"...far away from the missile point of aim,..."

In Column 5, line 8 should read:

"...present point of aim offset countermeasure..."

In Column 5, line 59 should read:

"...wide point of aim offset jamming..."

Signed and Sealed this
First Day of March, 2016

Michelle K. Lee
*Director of the United States Patent and Trademark Office*

Specification

In Column 6, lines 11-15 should read:

"...goiniometer point of aim, the result is that the missile flies without corrective guidance. If the countermeasure set is located above the point of aim, the missile is directed to fly down, while if the countermeasure is set to the right of the point of aim,..."

In Column 7, lines 25-26 should read:

"...system point of aim"

In Column 7, line 34 should read:

"...that point of aim of the missile"

In Column 11, line 43 should read:

"...wide point of aim offset.."

In Column 12, line 53 should read:

"...wide point of aim offset.."